(12) United States Patent
Wuestenberg

(10) Patent No.: US 11,619,175 B2
(45) Date of Patent: Apr. 4, 2023

(54) PLANETARY GEAR BOX AND GAS TURBINE ENGINE WITH PLANETARY GEAR UP BOX

(71) Applicant: Rolls-Royce Deutschland Ltd & Co KG, Blankenfelde-Mahlow (DE)

(72) Inventor: Hannes Wuestenberg, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 121 days.

(21) Appl. No.: 17/220,425

(22) Filed: Apr. 1, 2021

(65) Prior Publication Data

US 2021/0317787 A1   Oct. 14, 2021

(30) Foreign Application Priority Data

Apr. 8, 2020 (DE) .......................... 102020204563.1

(51) Int. Cl.
*F02C 7/36* (2006.01)
*F02C 6/20* (2006.01)
(Continued)

(52) U.S. Cl.
CPC ................ *F02C 7/36* (2013.01); *B64D 27/10* (2013.01); *B64D 31/14* (2013.01); *B64D 35/02* (2013.01); *F02C 6/20* (2013.01); *F16H 57/02* (2013.01); *F16H 57/032* (2013.01); *F16H 57/08* (2013.01); *F16H 57/082* (2013.01);
(Continued)

(58) Field of Classification Search
CPC ... F02C 7/36; F02C 6/20; B64D 27/10; B64D 31/14; B64D 35/02; F16H 57/02; F16H 57/032; F16H 57/08; F16H 57/082; F16H 2057/0081; F16H 2057/02043;
(Continued)

(56) References Cited

U.S. PATENT DOCUMENTS

2005/0025615 A1  2/2005  Gabrys et al.
2005/0026615 A1  2/2005  Kim
(Continued)

FOREIGN PATENT DOCUMENTS

DE   69918427 T2    11/2004
DE   102017114485 A1   1/2019
WO   2009032135 A1    3/2009

OTHER PUBLICATIONS

German Search Report dated Dec. 22, 2020 from counterpart German Patent Application No. 102020204563.1.

*Primary Examiner* — Jacob M Amick
*Assistant Examiner* — Charles J Brauch
(74) *Attorney, Agent, or Firm* — Shuttleworth & Ingersoll, PLC; Timothy Klima

(57) ABSTRACT

The invention relates to a planetary gear box in a gas turbine engine, characterized by at least one protective device in the interior of a casing of the planetary gear box, wherein the protective device is designed and configured to divert at least one particle which is moving in the casing, in particular in an event of damage, and/or to extract kinetic energy from the moving at least one particle, in particular by deformation of the protective device, wherein the protective device is coupled to the casing of the planetary gear box, to a planet gear and/or to a planet carrier. The invention also relates to a gas turbine engine.

20 Claims, 6 Drawing Sheets

(51) Int. Cl.
*F16H 57/02* (2012.01)
*F16H 57/08* (2006.01)
*B64D 35/02* (2006.01)
*B64D 31/14* (2006.01)
*B64D 27/10* (2006.01)
*F16H 57/032* (2012.01)
*F16H 57/00* (2012.01)

(52) U.S. Cl.
CPC .................. *F05D 2220/323* (2013.01); *F16H 2057/0081* (2013.01); *F16H 2057/02043* (2013.01)

(58) Field of Classification Search
CPC ..... F05D 2220/323; F05D 2260/40311; Y02T 50/60; F01D 21/045
See application file for complete search history.

(56) References Cited

U.S. PATENT DOCUMENTS

2010/0148396 A1 6/2010 Xie et al.
2019/0211914 A1* 7/2019 Palmer ...................... F16H 1/28

* cited by examiner

PLANETARY GEAR BOX AND GAS TURBINE ENGINE WITH PLANETARY GEAR UP BOX

This application claims priority to German Patent Application DE102020204563.1 filed Apr. 8, 2020, the entirety of which is incorporated by reference herein.

The present disclosure relates to a planetary gear box, and to a gas turbine engine having a planetary gear box, with features as disclosed herein.

In geared fan engines, planetary gear boxes are used which exhibit a very high power density, because high torques are transmitted from a driving turbine to a compressor, such as for example the fan stage. Spalling of particles can occur here. Gear boxes with so-called containment devices are known for example from WO 2009/032135 A1 and US 2005/0026615 A1.

It is the object to provide robust planetary gear boxes. Said object is achieved for example via a gearbox of the present disclosure.

Here, at least one protective device is arranged in the interior of a casing of the planetary gear box.

Here, the planetary gear box may basically have a star configuration or an epicyclic structure with revolving planet gears.

The protective device is designed and configured such that at least one particle which is moving in the casing, such as occurs for example in an event of damage or else during normal operation, is diverted in order to direct it in a different direction such that the particle can cause no or only minor damage in the casing.

Such a particle may for example be a piece of a gear wheel which has broken off, or a particle that has formed in the casing over the course of operation. In any case, the moving particle can have considerable kinetic energy.

In addition or alternatively, kinetic energy may be extracted from the at least one particle by the protective device, in particular by deformation of the protective device.

Furthermore, the protective device is coupled to the casing of the planetary gear box, to a planet gear and/or to a planet carrier. Since the protective device may also have multiple elements, complex structures can be realized here.

By means of the targeted diversion and/or the reduction of the kinetic energy of the flying particles in the casing, the hazard posed by the high-energy particles can be reduced.

Furthermore, the at least one protective device may be at least partially of annular form or have at least one annular section, wherein the plane of the annulus is perpendicular to the main axis of rotation of the gas turbine engine. An annular protective device may for example be arranged in encircling fashion in the casing of the planetary gear box or else annually around a planet gear. It is also possible for the recess to be arranged in a radial or axial direction in the planet carrier.

It is also possible for the at least one protective device to be arranged in a recess of the planet carrier. The at least one protective device may also be arranged in the recess by way of a non-positively locking connection or a screw connection.

Here, the at least one protective device may extend at least partially over the entire circumference of the gear box, in particular of the planet carrier.

Here, the at least one protective device may be arranged at least partially on the outer circumference of the planet carrier.

In a further embodiment, the at least one protective device projects partially or entirely into at least one recess of at least one planet gear, wherein the recess is arranged in particular radially and/or axially in the at least one planet gear.

In one embodiment, the at least one protective device projects partially or entirely into a recess of the planet gears. The gap between the at least one protective device and the base of the recess may in this case, for example in a radial direction, amount to less than 10%, in particular less than 5% of the recess depth, in particular less than 3%. It is thus possible for two regions within the casing to be separated by the protective device.

The at least one protective device may be produced in particular from metal, plastic, a textile material or a composite material or have these materials, wherein the at least one protective device is of homogeneous or inhomogeneous construction. In the case of a homogeneous design, a solid ring is for example present. In the case of an in homogeneous design, at least one region may for example have plastic deformation behaviour, by means of which flying particles can be absorbed in targeted fashion. For this purpose, it is for example possible for a plastically deformable region for a targeted deformation by the at least one particle to be provided. It is possible for the plastically deformable region to be arranged in the interior of the at least one annular protective device.

It is also possible for the protective device to have a means for comminuting the particles, in particular an abrasive means or a chipping means.

For a good protective action, it is possible in one embodiment for the greatest width of the at least one protective device to amount to between 2 and 20%, in particular between 5 and 15%, of the width of the planet gears.

The object is also achieved by a gas turbine engine having features as disclosed herein.

As noted elsewhere herein, the present disclosure may relate to a gas turbine engine, for example an aircraft engine. Such a gas turbine engine may comprise a core engine comprising a turbine, a combustor, a compressor, and a core shaft connecting the turbine to the compressor. Such a gas turbine engine may comprise a fan (with fan blades) which is positioned upstream of the core engine.

Arrangements of the present disclosure may be advantageous in particular, but not exclusively, for geared fans, which are driven via a gear box. Accordingly, the gas turbine engine may comprise a gear box which is driven via the core shaft and the output of which drives the fan in such a way that it has a lower rotational speed than the core shaft. The input to the gear box may be effected directly from the core shaft, or indirectly via the core shaft, for example via a spur shaft and/or a spur gear. The core shaft may be rigidly connected to the turbine and the compressor, such that the turbine and compressor rotate at the same rotational speed (with the fan rotating at a lower rotational speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The core engine may furthermore comprise a second turbine, a second compressor, and a second core shaft connecting the second turbine to the second compressor. The second turbine, second compressor and second core shaft may be arranged so as to rotate at a higher rotational speed than the first core shaft.

In such an arrangement, the second compressor may be positioned axially downstream of the first compressor. The second compressor may be arranged to receive (for example directly receive, for example via a generally annular duct) a flow from the first compressor.

The gear box may be designed to be driven by the core shaft that is configured to rotate (for example during use) at the lowest rotational speed (for example the first core shaft in the example above). For example, the gear box may be designed to be driven only by the core shaft that is configured to rotate (for example during use) at the lowest rotational speed (for example only by the first core shaft and not the second core shaft, in the example above). Alternatively, the gear box may be designed to be driven by one or more shafts, for example the first and/or second shaft in the example above.

In a gas turbine engine as described and/or claimed herein, a combustor may be provided axially downstream of the fan and compressor (or compressors). For example, the combustor may be directly downstream of (for example at the exit of) the second compressor, when a second compressor is provided. By way of further example, the flow at the exit of the compressor may be supplied to the inlet of the second turbine, if a second turbine is provided. The combustor may be provided upstream of the turbine(s).

The or each compressor (for example the first compressor and the second compressor as described above) may comprise any number of stages, for example multiple stages. Each stage may comprise a row of rotor blades and a row of stator blades, which may be variable stator blades (i.e. the angle of attack may be variable). The row of rotor blades and the row of stator blades may be axially offset with respect to one another.

The or each turbine (for example the first turbine and the second turbine as described above) may comprise any number of stages, for example multiple stages. Each stage may comprise a row of rotor blades and a row of stator blades. The row of rotor blades and the row of stator blades may be axially offset with respect to one another.

Each fan blade may have a radial span extending from a root (or a hub) at a radially inner location over which gas flows, or from a position of 0% span, to a tip with a 100% span. The ratio of the radius of the fan blade at the hub to the radius of the fan blade at the tip may be less than (or of the order of) any of the following: 0.4, 0.39, 0.38, 0.37, 0.36, 0.35, 0.34, 0.33, 0.32, 0.31, 0.3, 0.29, 0.28, 0.27, 0.26 or 0.25. The ratio of the radius of the fan blade at the hub to the radius of the fan blade at the tip may be in an inclusive range bounded by two values in the previous sentence (i.e. the values may form upper or lower bounds). These ratios may be referred to in general as the hub-to-tip ratio. The radius at the hub and the radius at the tip may both be measured at the leading edge (or the axially forwardmost edge) of the blade. The hub-to-tip ratio refers, of course, to that portion of the fan blade over which gas flows, i.e. the portion radially outside any platform.

The radius of the fan may be measured between the engine centerline and the tip of the fan blade at its leading edge. The diameter of the fan (which can generally be double the radius of the fan) may be larger than (or of the order of): 250 cm (approximately 100 inches), 260 cm, 270 cm (approximately 105 inches), 280 cm (approximately 110 inches), 290 cm (approximately 115 inches), 300 cm (approximately 120 inches), 310 cm, 320 cm (approximately 125 inches), 330 cm (approximately 130 inches), 340 cm (approximately 135 inches), 350 cm, 360 cm (approximately 140 inches), 370 cm (approximately 145 inches), 380 cm (approximately 150 inches), or 390 cm (approximately 155 inches). The fan diameter may be in an inclusive range bounded by any two of the values in the previous sentence (i.e. the values may form upper or lower bounds).

The rotational speed of the fan may vary in operation. Generally, the rotational speed is lower for fans with a larger diameter. Purely as a non-limiting example, the rotational speed of the fan under cruise conditions may be less than 2500 rpm, for example less than 2300 rpm. Purely as a further non-limiting example, the rotational speed of the fan under cruise conditions for an engine having a fan diameter in the range of from 250 cm to 300 cm (for example 250 cm to 280 cm) may also be in the range of from 1700 rpm to 2500 rpm, for example in the range of from 1800 rpm to 2300 rpm, for example in the range of from 1900 rpm to 2100 rpm. Purely as a further non-limiting example, the speed of the fan under cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

During the use of the gas turbine engine, the fan (with associated fan blades) rotates about an axis of rotation. This rotation results in the tip of the fan blade moving with a speed $U_{tip}$. The work done by the fan blades on the flow results in an enthalpy rise dH of the flow. A fan tip loading may be defined as $dH/U_{tip}^2$, where dH is the enthalpy rise (for example the average 1-D enthalpy rise) across the fan and $U_{tip}$ is the (translational) speed of the fan tip, for example at the leading edge of the tip (which may be defined as fan tip radius at the leading edge multiplied by angular speed). The fan tip loading at cruise conditions may be more than (or of the order of): 0.3, 0.31, 0.32, 0.33, 0.34, 0.35, 0.36, 0.37, 0.38, 0.39, or 0.4 (wherein all units in this passage are $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure can have any desired bypass ratio, wherein the bypass ratio is defined as the ratio of the mass flow rate of the flow through the bypass duct to the mass flow rate of the flow through the core at cruise conditions. In the case of some arrangements, the bypass ratio can be more than (or of the order of): 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by an engine nacelle and/or a fan casing.

The overall pressure ratio of a gas turbine engine as described and/or claimed herein may be defined as the ratio of the ram pressure upstream of the fan to the ram pressure at the exit of the highest pressure compressor (before entry into the combustor). As a non-limiting example, the overall pressure ratio of a gas turbine engine as described and/or claimed herein at cruising speed may be greater than (or of the order of): 35, 40, 45, 50, 55, 60, 65, 70, 75. The overall pressure ratio may be in an inclusive range bounded by any two of the values in the previous sentence (i.e. the values may form upper or lower bounds).

The specific thrust of an engine can be defined as the net thrust of the engine divided by the total mass flow through the engine. The specific thrust of an engine as described and/or claimed herein at cruise conditions may be less than (or of the order of): 110 Nkg$^{-1}$ s, 105 Nkg$^{-1}$ s, 100 Nkg$^{-1}$ s, 95 Nkg$^{-1}$ s, 90 Nkg$^{-1}$ s, 85 Nkg$^{-1}$ s or 80 Nkg$^{-1}$ s. The specific thrust may be in an inclusive range bounded by any two of the values in the previous sentence (i.e. the values may form upper or lower bounds). Such engines can be particularly efficient in comparison with conventional gas turbine engines.

A gas turbine engine as described and/or claimed herein may have any desired maximum thrust. Purely as a non-limiting example, a gas turbine as described and/or claimed herein may be capable of generating a maximum thrust of at least (or of the order of): 160 kN, 170 kN, 180 kN, 190 kN, 200 kN, 250 kN, 300 kN, 350 kN, 400 kN, 450 kN, 500 kN or 550 kN. The maximum thrust may be in an inclusive range bounded by any two of the values in the previous sentence (i.e. the values may form upper or lower bounds). The thrust referred to above may be the maximum net thrust under standard atmospheric conditions at sea level plus 15° C. (ambient pressure 101.3 kPa, temperature 30° C.), with the engine static.

During use, the temperature of the flow at the entry to the high-pressure turbine can be particularly high. This temperature, which may be referred to as TET, may be measured at the exit to the combustor, for example immediately upstream of the first turbine blade, which itself may be referred to as a nozzle guide blade. At cruising speed, the TET may be at least (or of the order of): 1400 K, 1450 K, 1500 K, 1550 K, 1600 K or 1650 K. The TET at cruising speed may be in an inclusive range bounded by any two of the values in the previous sentence (i.e. the values may form upper or lower bounds). The maximum TET in the use of the engine may be at least (or of the order of), for example: 1700 K, 1750 K, 1800 K, 1850 K, 1900 K, 1950 K or 2000 K. The maximum TET may be in an inclusive range bounded by any two of the values in the previous sentence (i.e. the values may form upper or lower bounds). The maximum TET may occur, for example, under a high thrust condition, for example under a maximum take-off thrust (MTO) condition.

A fan blade and/or airfoil portion of a fan blade described and/or claimed herein may be produced from any suitable material or combination of materials. For example, at least a part of the fan blade and/or airfoil may be produced at least in part from a composite, for example a metal matrix composite and/or an organic matrix composite, such as carbon fiber. As a further example, at least a part of the fan blade and/or airfoil may be produced at least in part from a metal, such as a titanium-based metal or an aluminum-based material (such as an aluminum-lithium alloy) or a steel-based material. The fan blade may comprise at least two regions produced using different materials. For example, the fan blade may have a protective leading edge, which is produced using a material that is better able to resist impact (for example from birds, ice or other material) than the rest of the blade. Such a leading edge may, for example, be produced using titanium or a titanium-based alloy. Thus, purely by way of example, the fan blade may have a carbon-fiber or aluminium-based body (such as an aluminium-lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture device which may engage with a corresponding slot in the hub (or disk). Purely as an example, such a fixture device may be in the form of a dovetail that may slot into and/or be brought into engagement with a corresponding slot in the hub/disk in order to fix the fan blade to the hub/disk. As a further example, the fan blades may be formed integrally with a central portion. Such an arrangement may be referred to as a blisk or a bling. Any suitable method may be used to manufacture such a blisk or such a bling. For example, at least a part of the fan blades may be machined from a block and/or at least part of the fan blades may be attached to the hub/disk by welding, such as e.g. linear friction welding.

The gas turbine engines described and/or claimed herein may or may not be provided with a variable area nozzle (VAN). Such a variable area nozzle may allow the exit area of the bypass duct to be varied during operation. The general principles of the present disclosure can apply to engines with or without a VAN.

The fan of a gas turbine as described and/or claimed herein may have any desired number of fan blades, for example 16, 18, 20, or 22 fan blades.

As used herein, cruise conditions may mean the cruise conditions of an aircraft to which the gas turbine engine is attached. Such cruise conditions can be conventionally defined as the conditions at mid-cruise, for example the conditions experienced by the aircraft and/or the engine between (in terms of time and/or distance) the top of climb and the start of descent.

Purely by way of example, the forward speed at the cruise condition can be any point in the range of from Mach 0.7 to 0.9, for example 0.75 to 0.85, for example 0.76 to 0.84, for example 0.77 to 0.83, for example 0.78 to 0.82, for example 0.79 to 0.81, for example of the order of Mach 0.8, of the order of Mach 0.85 or in the range of from 0.8 to 0.85. Any speed within these ranges may be the cruise condition. In the case of some aircraft, the cruise condition can be outside these ranges, for example below Mach 0.7 or above Mach 0.9.

Purely as an example, the cruise conditions may correspond to standard atmospheric conditions at an altitude that is in the range of from 10 000 m to 15 000 m, for example in the range of from 10 000 m to 12 000 m, for example in the range of from 10 400 m to 11 600 m (around 38 000 ft), for example in the range of from 10 500 m to 11 500 m, for example in the range of from 10 600 m to 11 400 m, for example in the range of from 10 700 m (around 35 000 ft) to 11 300 m, for example in the range of from 10 800 m to 11 200 m, for example in the range of from 10 900 m to 11 100 m, for example of the order of magnitude of 11 000 m. The cruise conditions may correspond to standard atmospheric conditions at any given altitude in these ranges.

Purely as an example, the cruise conditions may correspond to the following: a forward Mach number of 0.8, a pressure of 23000 Pa and a temperature of −55° C.

As used anywhere herein, "cruising speed" or "cruise conditions" may mean the aerodynamic design point. Such an aerodynamic design point (or ADP) may correspond to the conditions (comprising, for example, the Mach number, environmental conditions and thrust demand) for which the fan is designed to operate. This may mean, for example, the conditions at which the fan (or gas turbine engine) is designed to have optimum efficiency.

During operation, a gas turbine engine described and/or claimed herein may be operated under the cruise conditions defined elsewhere herein. Such cruise conditions may be determined by the cruise conditions (for example the conditions during the middle part of the flight) of an aircraft on which at least one (for example two or four) gas turbine engine(s) may be mounted in order to provide propulsive thrust.

It is self-evident to a person skilled in the art that a feature or parameter described in relation to one of the above aspects may be applied to any other aspect, unless these are mutually exclusive. Furthermore, any feature or any parameter described here may be applied to any aspect and/or combined with any other feature or parameter described here, unless these are mutually exclusive.

Embodiments will now be described by way of example, with reference to the figures, in which.

Figure 1:
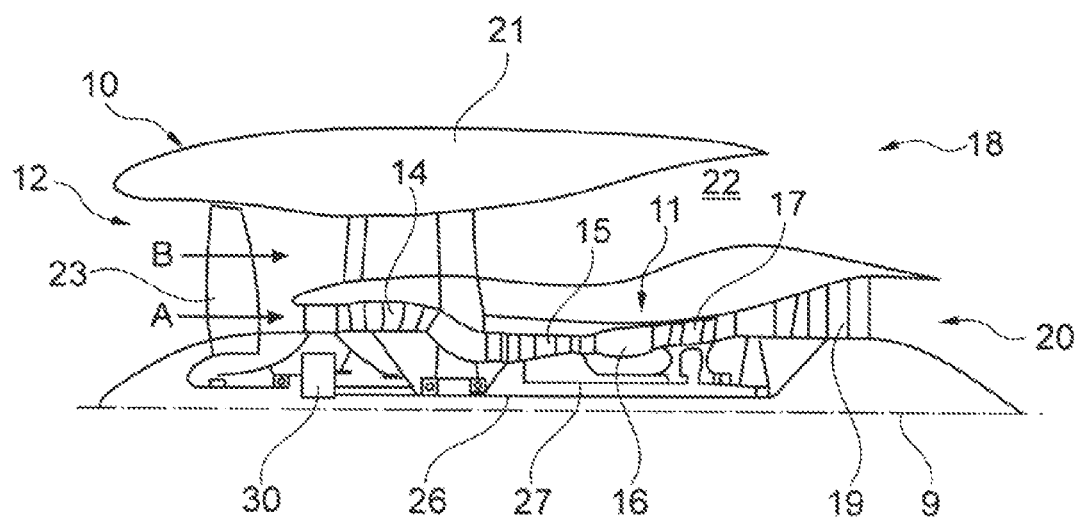
FIG. 1 shows a lateral sectional view of a gas turbine engine.

FIG. 1 illustrates a gas turbine engine 10 having a main axis of rotation 9. The gas turbine engine 10 comprises an air inlet 12 and a fan 23 that generates two air flows: a core air flow A and a bypass air flow B. The gas turbine engine 10 comprises a core 11 that receives the core air flow A. When viewed in the order corresponding to the axial direction of flow, the core engine 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 via a shaft 26 and an epicyclic planetary gear box 30.

During operation, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before being expelled through the nozzle 20 to provide a certain propulsive thrust. The high-pressure turbine 17 drives the high-pressure compressor 15 by means of a suitable connecting shaft 27. The fan 23 generally provides the major part of the propulsive thrust. The epicyclic planetary gear box 30 is a reduction gear box.

Figure 2:
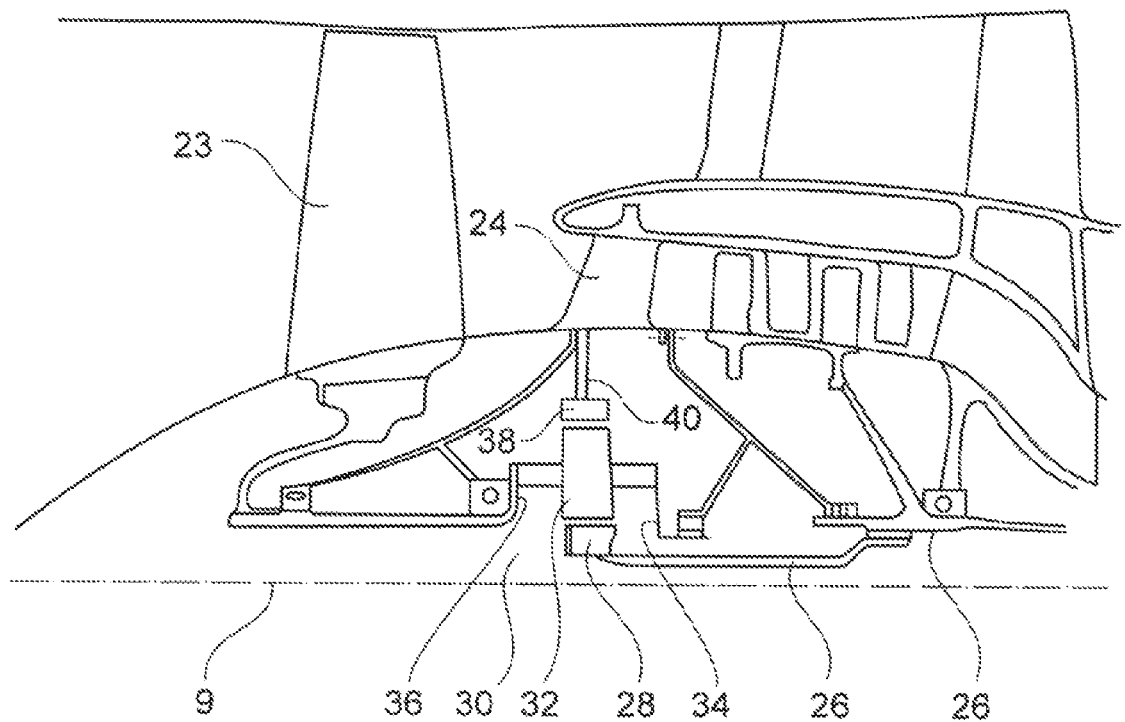
FIG. 2 shows a close-up lateral sectional view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun gear 28 of the epicyclic planetary gear box 30. Multiple planet gears 32, which are coupled to one another by a planet carrier 34, are situated radially to the outside of the sun gear 28 and mesh therewith. The planet carrier 34 guides the planet gears 32 in such a way that they circulate synchronously around the sun gear 28, whilst enabling each planet gear 32 to rotate about its own axis. The planet carrier 34 is coupled via linkages 36 to the fan 23 in order to drive its rotation about the engine axis 9. Radially to the outside of the planet gears 32 and meshing therewith is an external gear or ring gear 38 that is coupled, via linkages 40, to a stationary supporting structure 24.

It is noted that the terms "low-pressure turbine" and "low-pressure compressor" as used herein may be taken to mean the lowest-pressure turbine stage and lowest-pressure compressor stage (i.e. not including the fan 23) respectively, and/or the turbine and compressor stages that are connected together by the connecting shaft 26 with the lowest rotational speed in the engine (i.e. not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first, or lowest-pressure, compression stage.

Figure 3:
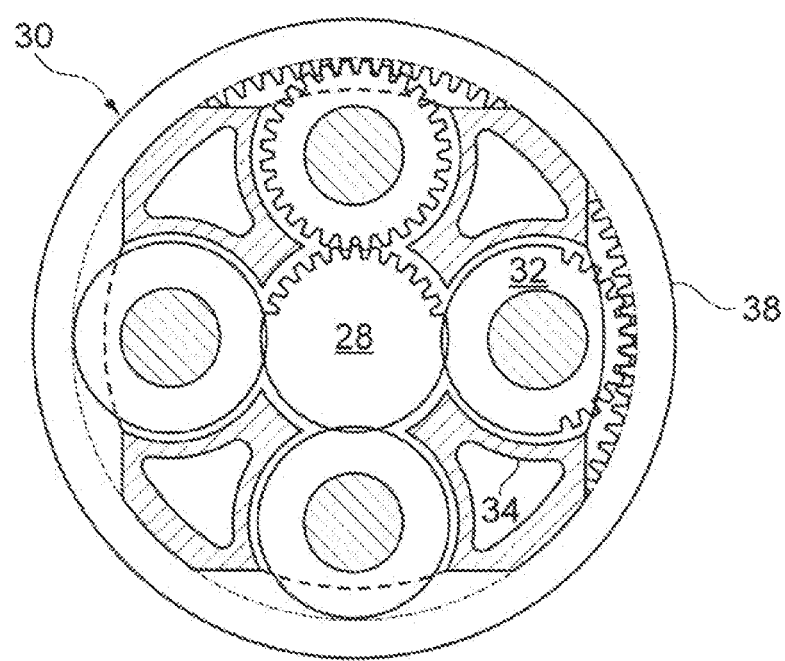
FIG. 3 shows a partially cut-away view of a gear box for a gas turbine engine.

The epicyclic planetary gear box 30 is shown by way of example in greater detail in FIG. 3. The sun gear 28, planet gears 32 and ring gear 38 in each case comprise teeth on their periphery to allow intermeshing with the other gearwheels. However, for clarity, only exemplary portions of the teeth are illustrated in FIG. 3. Although four planet gears 32 are illustrated, it will be apparent to the person skilled in the art that more or fewer planet gears 32 may be provided within the scope of protection of the claimed invention. Practical applications of an epicyclic planetary gear box 30 generally comprise at least three planet gears 32.

The epicyclic planetary gear box 30 illustrated by way of example in FIGS. 2 and 3 is a planetary gear box in which the planet carrier 34 is coupled to an output shaft via linkages 36, with the ring gear 38 being fixed. However, any other suitable type of planetary gear box 30 may be used. As a further example, the planetary gear box 30 may be a star arrangement, in which the planet carrier 34 is held fixed, with the ring gear (or external gear) 38 allowed to rotate. In such an arrangement, the fan 23 is driven by the ring gear 38. As a further alternative example, the gear box 30 can be a differential gear box in which both the ring gear 38 and the planet carrier 34 are allowed to rotate.

It will be appreciated that the arrangement shown in FIGS. 2 and 3 is by way of example only, and various alternatives are within the scope of protection of the present disclosure. Purely by way of example, any suitable arrangement may be used for locating the gear box 30 in the gas turbine engine 10 and/or for connecting the gear box 30 to the gas turbine engine 10. As a further example, the connections (for example the linkages 36, 40 in the example of FIG. 2) between the gear box 30 and other parts of the gas turbine engine 10 (such as the input shaft 26, the output shaft and the fixed structure 24) may have a certain degree of stiffness or flexibility. As a further example, any suitable arrangement of the bearings between rotating and stationary parts of the gas turbine engine 10 (for example between the input and output shafts of the gear box and the fixed structures, such as the gear casing) may be used, and the disclosure is not limited to the exemplary arrangement of FIG. 2. For example, where the gear box 30 has a star arrangement (described above), a person skilled in the art would readily understand that the arrangement of output and supporting linkages and bearing positions would usually be different from that shown by way of example in FIG. 2.

Accordingly, the present disclosure extends to a gas turbine engine having any arrangement of gear box types (for example star or epicyclic-planetary), supporting structures, input and output shaft arrangement, and bearing positions.

Optionally, the gear box may drive additional and/or alternative components (for example the intermediate-pressure compressor and/or a booster compressor).

Other gas turbine engines in which the present disclosure can be used may have alternative configurations. For example, such engines may have an alternative number of compressors and/or turbines and/or an alternative number of connecting shafts. By way of a further example, the gas turbine engine shown in FIG. 1 has a split flow nozzle 20, 22, meaning that the flow through the bypass duct 22 has its own nozzle that is separate from and radially outside the core engine nozzle 20. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable area. Whilst the described example relates to a turbofan engine, the disclosure may be applied, for example, to any type of gas turbine engine, such as an open-rotor (in which the fan stage is not surrounded by an engine nacelle) or turboprop engine, for example. In some arrangements, the gas turbine engine 10 may not comprise a gear box 30.

The geometry of the gas turbine engine 10, and components thereof, is/are defined by a conventional axis system, comprising an axial direction (which is aligned with the axis of rotation 9), a radial direction (in the bottom-to-top direction in FIG. 1), and a circumferential direction (perpendicular to the view in FIG. 1). The axial, radial and circumferential directions run so as to be mutually perpendicular.

In particular, very high torques are transmitted in a planetary gear box 30 in a gas turbine 10, wherein, for example, rotating parts (planet gears 32, planet carriers 34 etc.) rotate at high speeds. Here, if spalling of material occurs during operation, spalled particles 52 can exhibit very high kinetic energy. If such a particle 52 strikes another part within the casing 51 of the planetary gear box 30, this can lead to further damage. This can impair the function of the planetary gear box, and in the worst case lead to failure.

In conjunction with FIGS. 4 to 6, an embodiment of a planetary gear box 30 will be described in which a protective device 50 serves for minimizing the adverse effects of high-energy particles 52 within the casing 51.

Figure 4:
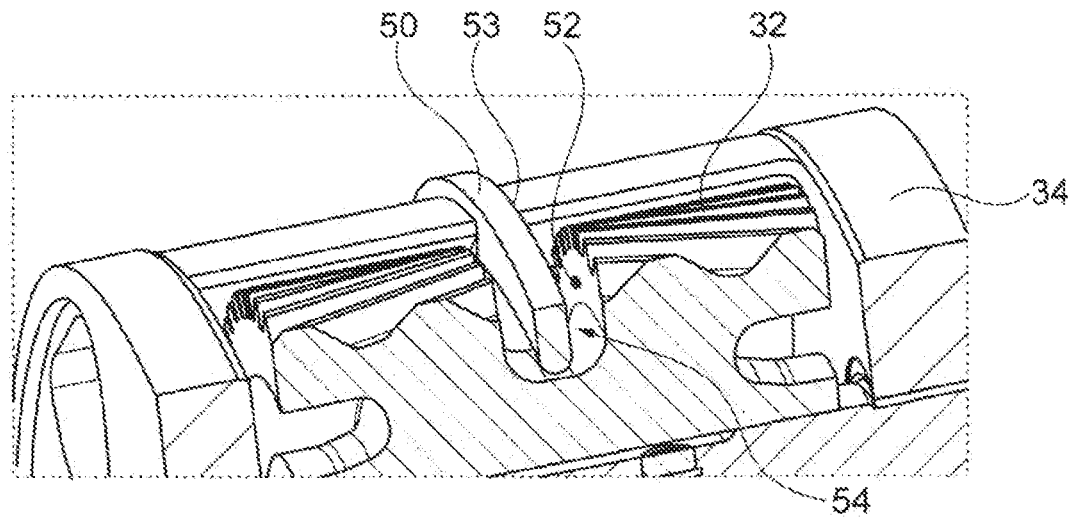
FIG. 4 shows a perspective detail view of an embodiment of a planetary gear box having a protective device in the planet carrier.

FIG. 4 illustrates a detail from the region of the planet carrier 34. Here, one of the planet gears 32 can be seen in the detail. Here, the planet gear 32 has two tooth surfaces which are parallel to one another and between which a recess 54 is arranged. Said tooth surfaces mesh with the inside of the ring gear 38, which is not illustrated here.

It is entirely possible that a particle 52 (illustrated only very schematically in FIGS. 4 and 5) spalls from the highly loaded planet gears 32 during operation and moves at high speed through the interior of the casing 51 (not illustrated here).

To minimize the effect of this moving high-energy particle 52, it is the case in the illustrated embodiment that a protective device 50 is provided in particular for intercepting the particles 32, which protective device is in this case of annular form and is arranged in a recess 53 of the planet carrier 34.

Now, if the particle 52 strikes the protective device 50, it can basically be diverted in terms of a movement direction. Alternatively or in addition, the protective device 50 may be deformed by the kinetic energy of the particle 52, such that said particle is either absorbed by the protective device 50 or at least loses energy, such that the moving particle no longer poses such a major hazard. The protective device 50 can thus serve for the containment of the particle 52. The protective device 50 may also have a means for comminuting the particle 52, such that the impact energy is used to break up the particle 52. For this purpose, it would for example be possible for chipping means to be used on the protective device 50.

For the sake of clarity, only one particle 52 is illustrated here, wherein it is entirely possible in reality for more or significantly more particles 52 to arise.

The protective device 50 is formed here as a ring which runs in encircling fashion around the planet carrier 34 and which has a flat cross section. Here, the annular protective device 50 is arranged in non-positively locking fashion in the recess 53. It is however basically also possible for other connection types, such as positive locking and/or cohesion, or else a screw connection, to be used. The flat ring of the protective device 50 is arranged here in a plane which is perpendicular to the main axis of rotation 9 (see FIG. 1). It would however basically also be possible for the protective device 50 to also be oriented differently within the casing 51.

The annular protective device 50 projects in this case radially into the recess 54 between the two tooth surfaces of the planet gear 32. An effective separation of the space in which the tooth surfaces of the planet gears 32 act is thus realized. If spalling occurs for example on the left-hand side of the planet gear 32, then the particle 52 that has spalled there cannot readily pass to the right-hand side, because it is for example absorbed by the protective device 50.

In the embodiment illustrated, only one annular protective device 50 is used. It is basically also possible to use more than one protective device 50, for example in each case at the sides of the planet carrier 34 or also at the inner sides of the casing 51.

It is not imperatively necessary for the protective device 50 to be of single-part construction as in the embodiment as per FIG. 4. Accordingly, it is also possible for the protective device 50 to be assembled from multiple parts, such that an annulus may be assembled from multiple annulus elements. It is also possible for the protective device 50 to have multiple elements which are arranged at different locations of the casing. One example for this will be described in conjunction with FIG. 7.

Figure 5:
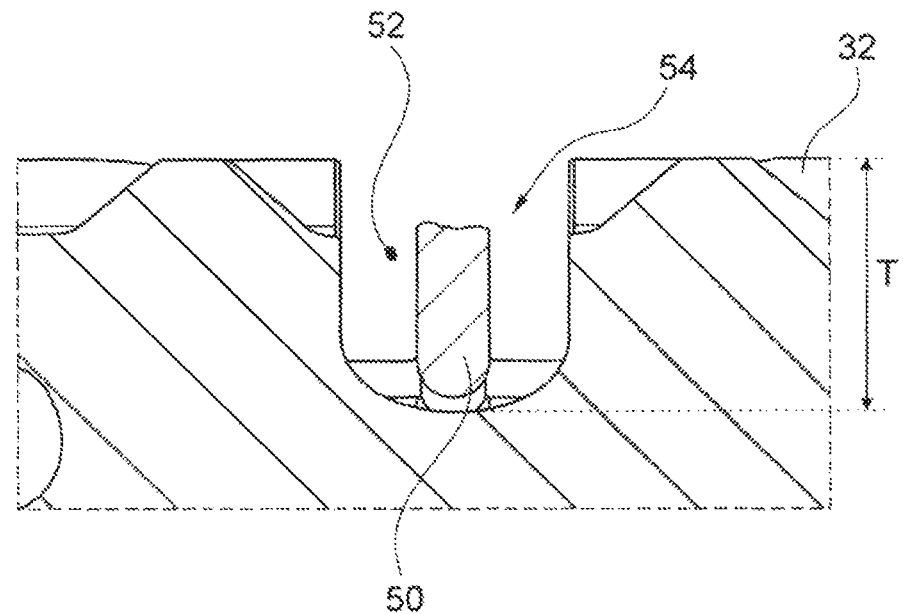
FIG. 5 shows a sectional view through a planet gear from the embodiment as per FIG. 4.

FIG. 5 illustrates a detail of the embodiment as per FIG. 4, specifically the arrangement of the annular-disk-like protective device 50 (only partially illustrated in FIG. 5) in the recess 54 in the planet gear 32. The recess 54 has a substantially U-shaped cross section with a recess depth T into which the protective device 50 projects radially from the outside. Here, the recess depth T is measured from the tips of the toothing. Here, only a narrow space remains free at the base of the recess 54, in this case for example less than 5% of the total recess depth T. By means of this configuration, the space within the casing 51 is divided in an effective manner into two parts, at least as regards the passage of high-energy particles 52 from one half into the other half.

In an axial direction, the greatest width of the protective device 50 fills approximately 40% of the axial extent of the recess 54, such that the separation of the two regions in the casing 51 is sufficiently effective.

The protective device 50 is formed here as a homogeneous component which is composed for example of metal, plastic, a textile material or a composite material. It is also possible for the protective device 50 to be composed of several of these parts. In conjunction with FIG. 8, an alternative embodiment will be illustrated in which the protective device is of inhomogeneous form.

Figure 6:
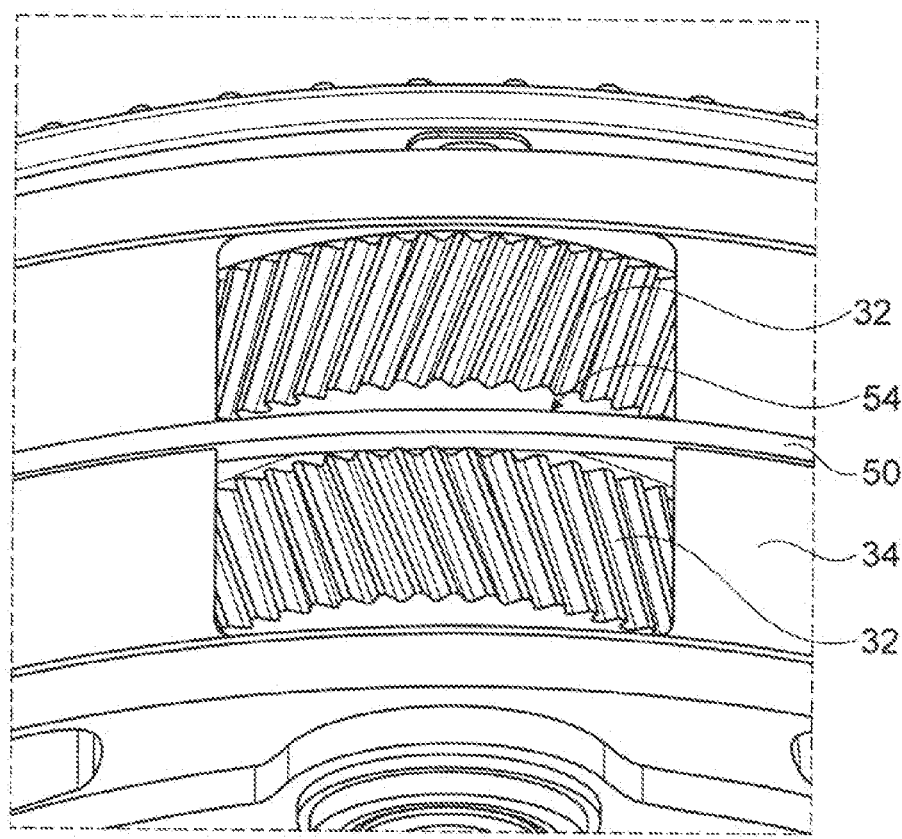
FIG. 6 shows a perspective detail view of the planet carrier of the embodiment as per FIG. 4.

FIG. 6 illustrates a further view of the embodiment of the planetary gear box 30, wherein, here, the planet carrier 34 with the planet gear 32 arranged therein is illustrated. It can be seen that the protective device 50, which is arranged between the two tooth surfaces of the planet gear 32, extends in a circumferential direction in the planet carrier 34 around all of the planet gears 32. Thus, the separation of the two regions within the planet carrier 34 by the annular protective device 50 can also be seen.

Figure 7:
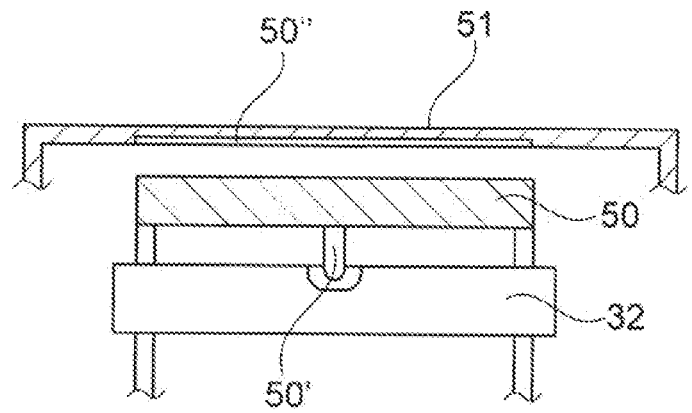
FIG. 7 shows a schematic sectional view through an embodiment of a planetary gear box having a protective device.

FIG. 7 illustrates an alternative embodiment in which the protective device 50 has not only the annular element 50' but also a lining 50" on the inner part of the casing 51. Here, the lining 50" is formed from plastically deformable areal material which extracts the kinetic energy from the particles 52 that are moving in the casing 51. This is an example of a protective device which has multiple elements 50', 50".

Figure 8:
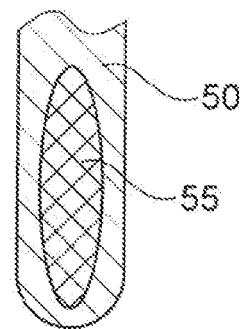
FIG. 8 shows a schematic sectional view through an annular protective device.

FIG. 8 schematically illustrates a section through an annular protective element 50 (see FIGS. 4 to 6) which is of inhomogeneous construction. Here, the protective element 50 has a particularly plastically deformable core 55 which is surrounded by a relatively hard material. The protective device 50 may also be of exactly reversed design: a hard core is surrounded by a plastically deformable material.

A high-energy particle 52 which strikes this protective device 50 loses a considerable amount of energy during the impact, which energy is converted into deformation energy.

Figure 9:
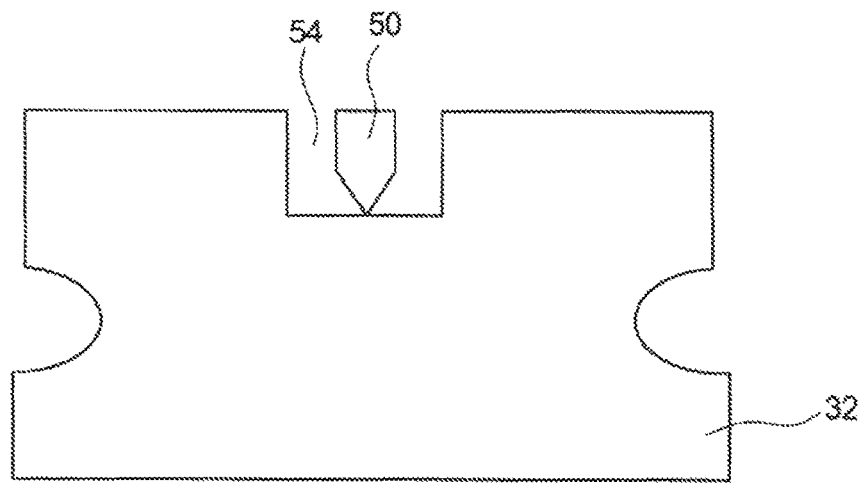
FIG. 9 shows a sectional view through a planet gear having a protective device according to a further embodiment.

FIG. 9 illustrates a modification of the embodiment according to FIGS. 4 and 5, such that reference can be made to the description above. Here, the protective element 50 (formed in some cases as a chipping element) causes the planet gear 32 to be divided into two halves.

Figure 10:
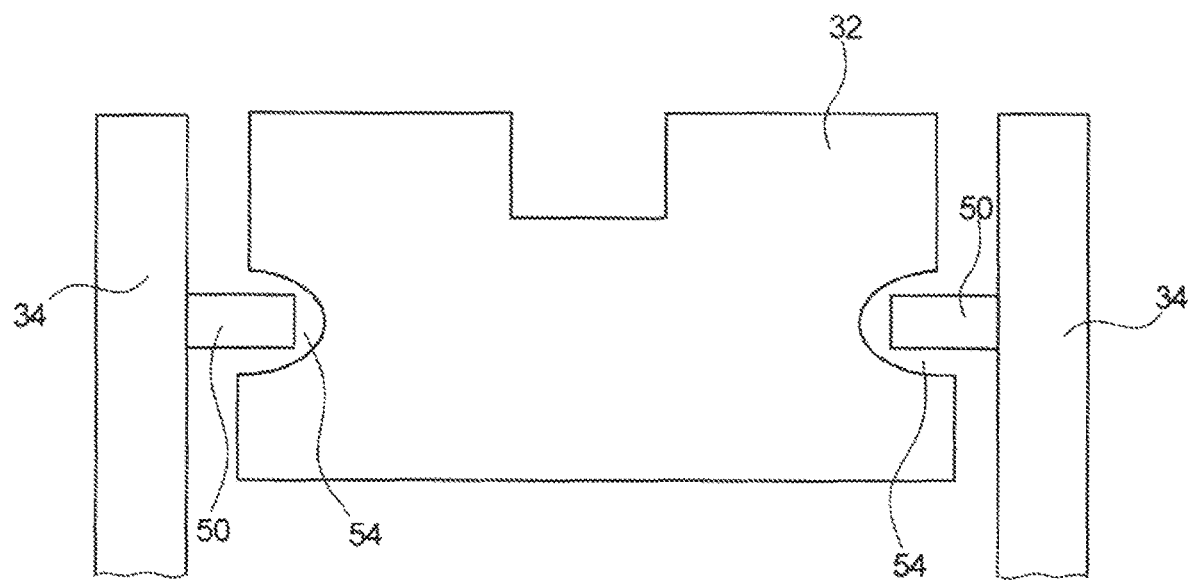
FIG. 10 shows a sectional view through a planet gear having a protective device which is oriented in an axial direction.

FIG. 10 illustrates a further modification of the embodiment according to FIGS. 4 and 5, such that reference can likewise be made to the description above. Here, the recess 54 in the planet gear 32 is arranged in encircling fashion in an axial direction on both sides of the planet gear 32. It is basically also possible for the embodiments as per FIG. 5 and FIG. 10 to be combined with one another, such that the planet gear 32 has axial and radial recesses 54.

It will be understood that the invention is not limited to the embodiments described above, and various modifications and improvements can be made without departing from the concepts described herein. Any of the features may be used separately or in combination with any other features, unless they are mutually exclusive, and the disclosure extends to and includes all combinations and subcombinations of one or more features which are described here.

LIST OF REFERENCE SIGNS

9 Main axis of rotation
10 Gas turbine engine
11 Core engine
12 Air inlet
14 Low-pressure compressor
15 High-pressure compressor
16 Combustion device
17 High-pressure turbine
18 Bypass thrust nozzle
19 Low-pressure turbine
20 Core thrust nozzle
21 Engine nacelle
22 Bypass duct
23 Fan
24 Stationary supporting structure
26 Shaft
27 Connecting shaft
28 Sun gear
30 Gear box, planetary gear box
32 Planet gears
34 Planet carrier
36 Linkage
38 Ring gear
40 Linkage
50 Protective device
50' Annular element
50' Areal element
51 Casing of the gear box
52 Particle in the interior of the casing
53 Recess of the planet carrier
54 Recess in planet gears
55 Plastically deformable region in protective device
A Core air flow
B Bypass air flow
T Recess depth

The invention claimed is:

1. A planetary gear box in a gas turbine engine, comprising:
   a protective device positioned in an interior of a casing of the planetary gear box,
   wherein the protective device is configured to divert at least one particle which is moving in the casing,
   wherein the protective device is coupled to at least one chosen from the casing of the planetary gear box, a planet gear, and a planet carrier;
   wherein the protective device projects partially or entirely into at least one recess of the planet gear, wherein the recess is arranged in at least one chosen from radially and axially in the planet gear.

2. The planetary gear box according to claim 1, wherein the protective device is at least partially of annular form or includes at least one annular section, wherein a plane of the annulus is perpendicular to a main axis of rotation of the gas turbine engine.

3. The planetary gear box according to claim 1, wherein the protective device is arranged in a recess of the planet carrier.

4. The planetary gear box according to claim 3, wherein the recess is arranged in a radial direction or axial direction in the planet carrier.

5. The planetary gear box according to claim 3, wherein the protective device is arranged in the recess by a non-positively locking connection or a screw connection.

6. The planetary gear box according to claim 1, wherein the protective device extends at least partially over an entire circumference of the planetary gear box.

7. The planetary gear box according to claim 1, wherein the protective device is arranged at least partially on an outer circumference of the planet carrier.

8. The planetary gear box according to claim 1, wherein a gap between the protective device and a base of the recess in a radial direction amounts to less than 10% of the recess depth.

9. The planetary gear box according to claim 1, wherein the protective device is produced from a metal, a plastic, a textile material or a composite material or includes the metal, the plastic, the textile material or the composite material, wherein the protective device is of homogeneous or inhomogeneous construction.

10. The planetary gear box according to claim 1, wherein the protective device includes a plastically deformable region for a targeted deformation by the at least one particle.

11. The planetary gear box according to claim 10, wherein the plastically deformable region is arranged in an interior of the protective device.

12. The planetary gear box according to claim 1, wherein a greatest width of the protective device amounts to between 2 and 20% of a width of the planet gear.

13. The planetary gear box according to claim 1, wherein the protective device includes a device for comminuting the at least one particle.

14. A gas turbine engine for an aircraft, the gas turbine engine comprising:
   a core engine comprising a turbine, a compressor, and a core shaft connecting the turbine to the compressor;
   a fan which is positioned upstream of the core engine, wherein the fan comprises a plurality of fan blades; and
   the planetary gear box according to claim 1, the planetary gear box being driven by the core shaft, wherein the fan is driven by the planetary gear box at a lower speed than the core shaft.

15. The gas turbine engine as claimed in claim 14, wherein:
   the turbine is a first turbine, the compressor is a first compressor, and the core shaft is a first core shaft;
   the core engine further comprises a second turbine, a second compressor, and a second core shaft which connects the second turbine to the second compressor; and
   the second turbine, second compressor, and second core shaft are arranged to rotate at a higher speed than the first core shaft.

16. The planetary gear box according to claim 1, wherein the protective device extends at least partially over an entire circumference of the planet carrier.

17. The planetary gear box according to claim 8, wherein the gap between the at least one protective device and the base of the recess in a radial direction amounts to less than 5% of the recess depth.

18. The planetary gear box according to claim 13, wherein the device for comminuting the at least one particle includes an abrasive surface or a chipping surface.

19. A planetary gear box in a gas turbine engine, comprising:
   a protective device positioned in an interior of a casing of the planetary gear box,
   wherein the protective device is configured to extract kinetic energy from the at least one particle moving in the casing, by deformation of the protective device,
   wherein the protective device is coupled to at least one chosen from the casing of the planetary gear box, a planet gear, and a planet carrier,
   wherein the protective device includes a plastically deformable region for providing targeted impact deformation by the at least one particle, the plastically deformable region made of a plastically deformable material.

20. The planetary gear box according to claim 19, wherein the plastically deformable material is supported by a harder material.

* * * * *